Figure 4:
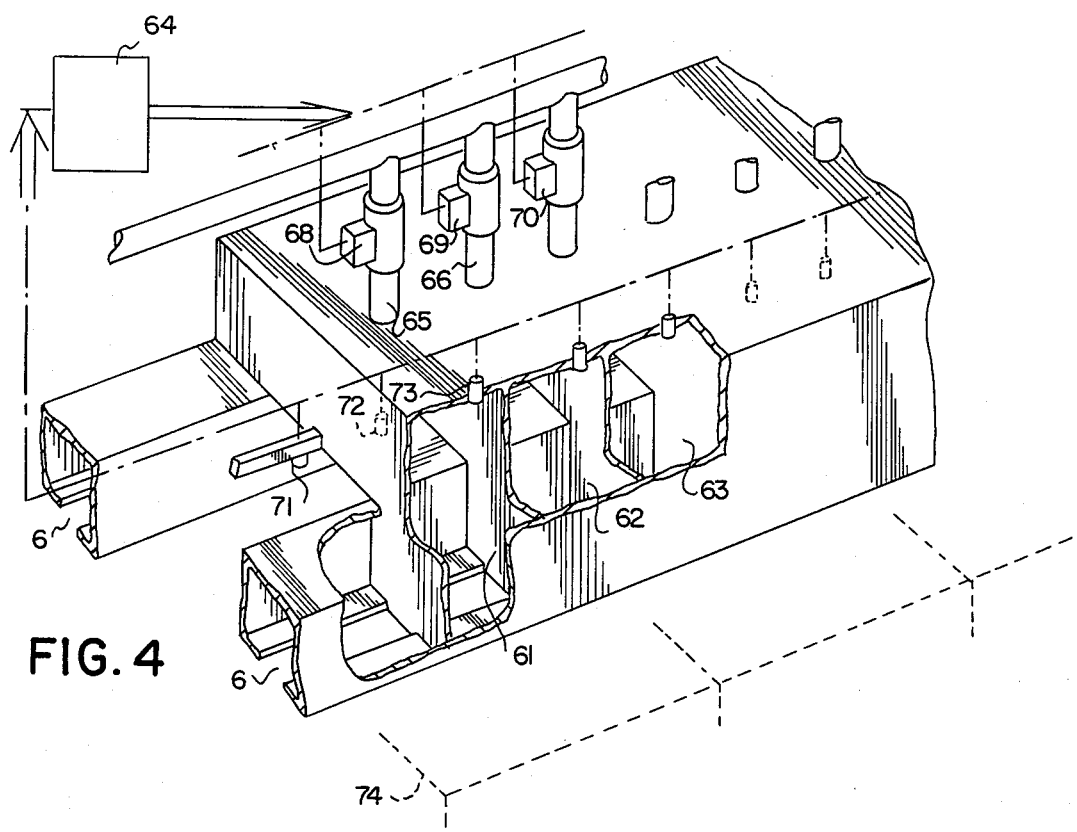

United States Patent [19]

Uithoven

[11] Patent Number: 4,856,262
[45] Date of Patent: Aug. 15, 1989

[54] APPARATUS FOR DISPOSING PACKING IN PREDETERMINED RELATIVE POSITIONS

[75] Inventor: Pieter G. Uithoven, Gorssel, Netherlands

[73] Assignee: Thomassen & Drijver-Verblifa N.V., Netherlands

[21] Appl. No.: 583,342

[22] Filed: Feb. 24, 1984

[30] Foreign Application Priority Data

Mar. 8, 1983 [NL] Netherlands .................. 8300839

[51] Int. Cl.⁴ ............... B65G 43/10; B65G 47/53; B65B 35/38
[52] U.S. Cl. ............................... 53/499; 53/246; 53/251; 53/534; 414/793.1; 198/418.2
[58] Field of Search ............... 53/246, 247, 250, 495, 53/498, 499, 534, 537, 539, 543, 251; 198/689; 414/73

[56] References Cited

U.S. PATENT DOCUMENTS

| 2,704,177 | 3/1955 | Neaves | 53/534 |
| 2,813,637 | 11/1957 | Perry et al. | 414/73 X |
| 3,238,694 | 3/1966 | Bartlett et al. | 53/534 X |
| 3,592,329 | 7/1971 | Fleischauer | 198/689 X |
| 3,774,778 | 11/1973 | Flaig | 53/237 X |
| 4,442,657 | 4/1984 | Busseniers et al. | 53/534 X |

FOREIGN PATENT DOCUMENTS 888350 1/1962 United Kingdom .................. 414/73

Primary Examiner—Douglas D. Watts
Assistant Examiner—Michael D. Folkerts
Attorney, Agent, or Firm—John P. Snyder

[57] ABSTRACT

In a conveying system for transporting a sequence of articles to a suspending point in captured relation and then transporting them by vacuum suspension to a plurality of separate discharge stations, comprising the combination of:

at least a pair of conveyor belts disposed in vertically spaced, overlapping relation to define an elongate nip therebetween extending from a capturing point to a suspending point, the upper of said belts extending beyond the suspending point and being provided with a series of openings extending longitudinally thereof;

feed apparatus for feeding articles to the capturing point in sequentially spaced relation so as to be captured between the belts and transported therebetween to the suspending point;

suction apparatus overlying the upper belt beyond the suspending point and defining a first chamber for subjecting the articles to vacuum through the openings to suspend them after they pass beyond the suspending point, the suction apparatus defining a plurality of further and separate chambers in spaced sequence beyond said suspending point; and control apparatus for independently controlling vacuum to the further suction chambers to release the articles sequentially at their respective stations beginning at that station located most remotely from the suspending point.

8 Claims, 2 Drawing Sheets

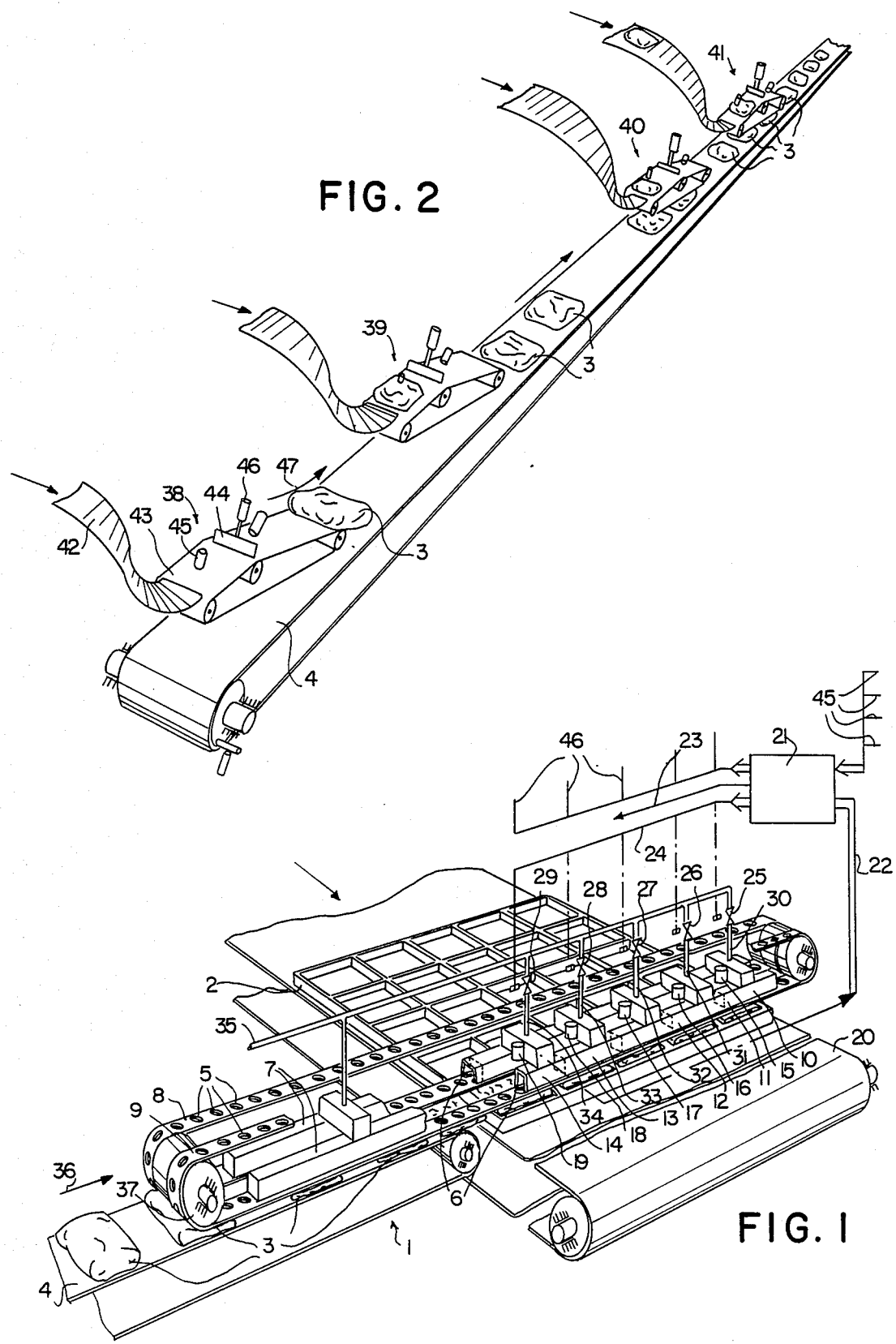

APPARATUS FOR DISPOSING PACKING IN PREDETERMINED RELATIVE POSITIONS

The invention relates to the disposition of packings, e.g. previously filled, cushion-shaped bags, sometimes termed "pouches", in predetermined relative positions. In general the invention relates to handling packages which do not allow a simple arrangement in a desired pattern, for example, packings having a flange rim and/or having a shape tapering upwards or downwards. An example of packings simply arrangeable in a desired pattern is a cylindrical container supplied for example by a conveyor belt bounded by upright walls and settling by nature at an end wall in an array of densest stacking.

The aforesaid cushion-shaped bags are particularly intended for pretreated foodstuffs such as ready-to-hand ragout, rice or the like, in general foodstuffs cohering fairly little. Machine-handling of such bags involves the problem that due to the poor coherence of the foodstuffs the shape of the bags may greatly vary. It is noted here that a bag is formed by welding two impermeable sheets on three sides to one another, after which the foodstuff is introduced through a filling opening, the open upper edge is closed by welding and the filled and closed bag is subsequently deposited on a conveyor belt. Obviously in this method the distribution of the foodstuffs in the filled bag on the conveyor belt will be little homogeneous.

It is furthermore noted that when pushed by means of a conveyor belt the filled bags may slide one on the other, which in connection with the high flexibility of the filled bags gives rise to unpredictable deformations and relative positions, so that machine-handling is not possible.

In a given bag-handling mode the bags are deposited one by one by hand on a carrier plate in respective spaces separated from one another by upright walls. Such a manual method is expensive and appears to be unsufficiently fast and reliable in practice.

The invention has for its object to solve the problems of the known technique and provides a device for disposing previously filled, cushion-shaped bags ("pouches") in predetermined relative positions comprising a conveyor member for supplying the bags spaced apart from one another an endless, perforated conveyor belt extending over a given longitudinal distance above said transport feeding member and defining an elongate nip therewith which compresses each bag to a predetermined thickness and having its active part passing below a subatmospheric pressure chamber having a suction slot co-operating with said perforations, said subatmospheric pressure chamber having in its hindmost part, viewed in the transport direction, a number of independently energizable subatmospheric pressure compartments, at or near each of which is placed a detector for detecting the presence of a bag, a delivery transport member extending below the conveyor belt and being movable by driving means transversely of the direction of movement of said belt, the width of said transport member being at least equal to the length of the hindmost part of the conveyor belt provided with subatmospheric pressure compartments, a central control-unit coupled with the detectors, the independently energized subatmospheric compartments and the driving means so as to effect a series of cycles in which each cycle comprises advancing the delivery transport member and then filling each of the discharge stations thereof before beginning the next cycle, and wherein the end of each cycle is effected when a signal produced by the last upstream detector deenergizes its associated subatmospheric compartment so that a complete row of bags is deposited on the delivery transport member and the formed row of bags is displaced over at least a distance corresponding to the size of the bags.

The embodiment in which the subatmospheric pressure chamber communicates with a source of medium at subatmospheric pressure and the subatmospheric pressure compartments communicate with said source through valves to be selectively opened and closed by the central control-unit has proven to be efficient.

In order perform handling of the bags in the device in a most reliable manner with a minimum risk of disturbances and to minimize the required thickness of an enveloping packing the invention provides a variant in which a roller is arranged above the transport member and in front of the subatmospheric pressure chamber for equalizing the thickness of the packings.

Since in using a single transport belt there is a certain risk of some deformation of the bags which might impede the satisfactory operation of the device, it is advantageous to use an embodiment in which the perforated conveyor belt is sectioned. This particular feature may be advantageously used for arranging the detectors in the free medium zone.

In this case in a device comprising a levelling roller it is preferred to use an embodiment characterized in that the roller constitutes in addition the reversing roller for the conveyor belt and in that it is provided with such circumferential depressions that the roller surface is partly formed by the perforated conveyor belt.

The invention will now be described more fully with reference to the drawing of a few embodiments. The drawing shows in FIG. 1 a schematic, fragmentary, perspective view of a device embodying the invention in a first embodiment, FIG. 2 a schematic representation of a bag feeding device, FIG. 3 a fragmentary, perspective view of part of a bag feeding device in a different embodiment and FIG. 4 a fragmentary, perspective view of part of a variant of the device shown in FIG. 1.

FIG. 1 shows a device 1 for depositing previously filled, cushion-shaped bags 3 on a plate 2 in a predetermined relative arrangement. The device 1 comprises an endless conveyor belt 4 for feeding the bags 3 spaced apart from one another, an endless, sectioned conveyor belt 8, 9 extending over a given longitudinal distance, in overlapping spaced relation above said conveyor belt 4 to define a longitudinally extending nip therewith which compresses the bags to a uniform thickness. The laterally spaced sections 8 and 9 of the conveyor belt are provided with perforations 5 which pass in alignment below the respective suction slots 6 of the subatmospheric chamber 7. As will be seen in FIG. 1, the two chambers 7 extend throughout most of the overlapped region between the conveyor flight 4 and the overlying sections 8 and 9 and project beyond the suspending point where the overlap ceases. In this way, the bags are assured of being suspended by suction from the sections 8 and 9 as they pass beyond the suspending point on their way to the the respective discharge stations over the plate 2. Each chamber 7 is separated into a series of independently energizable subatmospheric pressure compartments 10, 11, 12, 13, 14 at or near each of which a detector 15, 16, 17, 18, 19 respectively is arranged for detecting the presence of a bag 3. A delivery conveyor belt 20 or other transport member extends below the conveyor belt 8, 9 and is stepwise movable by driving means (not shown) transversely of the direction of movement of said belt 8, 9.

This stepwise movement advances the sectioned plate 2 so that an empty row of package-receiving section is disposed beneath the belts 8 and 9 and their associated subatmospheric compartments 10–14. The stepwise movement is initiated in response to a signal from the control unit 21 at the output conductor 23 thereof, which signal appears when all of the spaces in the row underlying the compartments 10–14 have been filled. The filling of a complete row constitutes the completion of one cycle of operation, the conveyor 20 advances one step and the next cycle begins. When the first detector 15 senses the presence of a package 3, it controls the valve 25 to terminate the presence of subatmospheric air in its associated compartment 10 thereby to drop the package into the section of the plate 2 beneath such compartment 10; the next detector 16 when it senses the presence of a package 3 operates the valve 26, and so on until the cycle is completed. In this way, the last detector 19 is effective to cause the control unit 21 to provide the signal at the conductor 23 for stepping the plate 2 forward.

The detectors 15 to 19 are arranged for detecting the presence of one bag, for example, by optical or electric measurement. The detectors 15 to 19 apply through a corresponding number of conductors 22 their signals to an equal number of inputs of the central control-unit 21, which applies control-signals through an output conductor 23 to the driving means (not shown) for moving the delivery member 20. Output conductors 24 are connected to valves 25, 26, 27, 28, 29 added to the respective subatmospheric pressure compartments 10 to 14 and included in associated subatmospheric pressure ducts 30, 31, 32, 33, 34 forming branches of a source (not shown) connected with a subatmospheric main duct 35, which directly communicates with the subatmospheric pressure chamber 7.

At the foremost end, viewed in the transport direction 36, the conveyor belt 8, 9 runs along a reversal roller 37, which serves in addition as a roller for levelling the thickness of the bags 3. This roller/reversing roller 37 has circumferential depressions at the ends along which the conveyor belt 8, 9 is moving, the depth of the depressions in a radial direction being such that the roller surface is partly formed by the conveyor belt 8, 9, which means that the active radius of the entire active axial length is the same.

FIG. 2 shows that in the present embodiment four devices 38, 39, 40 and 41 deposit the filled, cushion-shaped bags 3 on the endless conveyor belt 2. For this purpose the feeding device 4 shown in FIG. 2 comprises identical devices 38, 39, 40, 41, of which only the device 38 will be discussed. The device 38 comprises a guide path 42 for depositing each bag 3 on the conveyor belt 43 from a production device (not shown). A bag 3 is arrested above a stop 44. In front of the stop 44 a detector 45 is arranged for detecting the presence of a bag. The output signal of the detector 45 is applied to the central control-unit 21, which can give off control-signals to solenoids 46 for displacing the stops 44 out of the path of the bags 3 so that the bags are deposited on the conveyor belt 4 as indicated by the arrow 47. The control is performed so that the bags 3 attain the roller 37 with given intervals.

Figure 3:
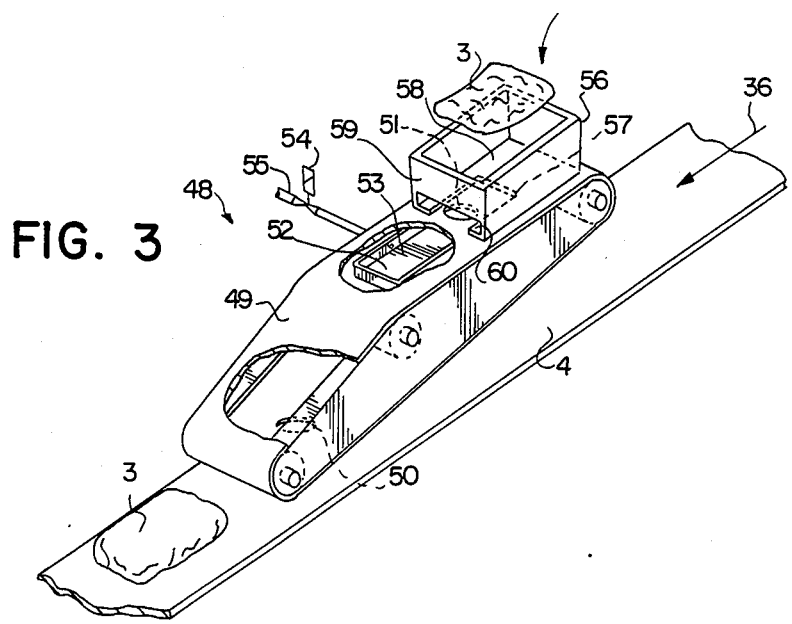

FIG. 3 shows a feeding device 48, a variant of the devices 38, 39, 40, 41. The device 48 comprises a conveyor belt 49 having two perforations 50, 51. These perforations 50, 51 can co-operate with a suction slot 53 on the top side of a suction chamber 52 for exerting a suction force on a bag 3 after a valve 54 in a subatmospheric pressure duct 55 is opened, the bag being located in a cup 56 having a bottom 58 with a recess 57. The front wall 59 of the cup 56 has a slot 60 for the bags 3.

The device 1 shown in FIG. 1 has a limitation. The position of the subatmospheric pressure compartments 10 to 14 corresponds to the various spaces on the plate 2. The use of bags of different dimensions and of a corresponding plate is, therefore, not possible with the device of FIG. 1.

A slight technical limitation of the device 1 is furthermore that at a high transport rate of the bags 3 there is a risk that due to the high rate the bags will not be arrested at an end rim of a space but wholly or partly pass across the same, which has an adverse effect on a satisfactory operation of the device.

It would, therefore, be advantageous to construct the device so that it can match different, for example, standardized dimensions of the bags, whilst in addition it is desirable to construct the device so that the ballistics of the bags, which are important in particular for high rates of the bags, can be taken into account.

FIG. 4 shows a device having the aforesaid technical advantages.

FIG. 4 shows a number of subatmospheric pressure compartments 61, 62, 63 . . . all of which can be independently energized by a central control-unit 64 by actuating valves 68, 69, 70 . . . included in subatmospheric pressure ducts 65, 66, 67 . . . . A detector 71, 72, 73 is added to each of the subatmospheric pressure compartments 61, 62, 63 respectively. These detectors apply a signal in the presence of a bag like in the embodiment shown in FIG. 1 the central control-unit as a result of which in contrast to the embodiment of FIG. 1, the subatmospheric pressure compartments are groupwise energized or, respectively de-energized rather than individually. In this embodiment the subatmospheric pressure compartments 61, 62, 63 . . . have a longitudinal dimension equal to one third of the longitudinal dimension of the subatmospheric pressure compartments 10, 11, 12, 13, 14 of FIG. 1. In this way by energizing each time a group of two subatmospheric pressure compartments 61, 62, 63 in accordance with the sequence of FIG. 1 bags having a size equal to two thirds of the size of the bags shown in FIG. 1 can be deposited in the correspondingly proportioned spaces on a carrying plate 74 shown schematically.

It should be noted that the embodiment shown in FIG. 4 is moreover capable of matching the ballistics of rapidly transported bags. The control may take place in a manner such that each time a group of subatmospheric pressure compartments 61, 62, 63 . . . is de-energized when one compartment has an upstream position with respect to the position where the bag has to be deposited. In this way it is avoided that the bag should strike the corresponding rear wall of a space with too high a speed or should slide across said rear wall. The particular compartment 61, 62 or 63 which is chosen to effect the control allows the ballistics of the bags 3 to be compensated. That is, by choosing the compartment 61 as the controlling compartment, the most adverse ballistics can be overcome because this compartment is the furthest upstream from the intended position at which the bag is to be deposited; the use of the compartment 62 as the controlling compartment will accommodate for a lesser ballistic problem, and the choice of the compartment 63 will accommodate for the least ballistic problem.

It will be obvious that the invention is not limited to the embodiments described and illustrated. For example, the embodiment shown in FIG. 4 may be provided with a different number of compartments of a simultaneously energizable group, whilst if desired, in order to enhance the reliability of positioning partitions adapted to move up and down may be arranged in the free intermediate zone of the sectioned conveyor belt in order to prevent a rapidly transported bag from passing across the rear wall of a space.

What is claimed is:

1. In a conveying system for transporting a sequence of articles to a suspending point in captured relation and then transporting them by vacuum suspension to a plurality of separate discharge stations, comprising the combination of:

at least a pair of conveyor belts disposed in vertically spaced, overlapping relation to define an elongate nip therebetween extending from a capturing point to a suspending point, the upper of said belts extending beyond said suspending point and being provided with a series of openings extending longitudinally thereof;

feed means for feeding articles to said capturing point in sequentially spaced relation so as to be captured between said belts and transported therebetween to said suspending point;

suction means overlying said upper belt beyond said suspending point and defining a first chamber for subjecting the articles to vacuum through said openings to suspend them after they pass beyond said suspending point, said suction means defining a plurality of further and separate chambers in spaced sequence beyond said suspending point; and control means for independently controlling vacuum to said further suction chambers to release said articles sequentially at their respective stations beginning at that station located most remotely from said suspending point.

2. In a conveying system as defined in claim 1 wherein said control means includes detector means associated with each station for effecting the discharge of each article at its respective station.

3. In a conveying system for transporting a sequence of articles to a suspending point in captured relation and then transporting them by vacuum suspension to a plurality of separate discharge stations, comprising the combination of:

a pair of endless conveyor means disposed in substantially parallel, vertically spaced, and overlapping relation to define an elongate nip therebetween extending from a capturing point to a suspending point, the upper of said conveyor means extending beyond said suspending point and having a suspending flight provided with a series of openings extending longitudinally thereof;

feed means for feeding articles to said capturing point in sequentially spaced relation so as to be captured between said conveyor means and transported therebetween to said suspending point;

suction means overlying said suspending flight of said upper conveyor means beyond said suspending point and defining a first chamber for subjecting the articles to vacuum through said openings to suspend them from said suspending flight after they pass beyond said suspending point, said suction means defining a plurality of further and separate chambers in spaced sequence beyond said suspending point;

transport means disposed in spaced relation below said suspending flight and defining a plurality of rows of discharge stations, said transport means being steppable sequentially to position said rows of discharge stations, one row at a time, below said suspending flight with the discharge stations of the positioned row extending lengthwise of the suspending flight; and control means for independently controlling vacuum to said further suction chambers to release said articles sequentially at their respective stations of a row thereof positioned below said suspending flight, and including detector means for releasing said articles sequentially beginning at the discharge station located most remotely from said suspending point.

4. In a conveying system for transporting a sequence of articles to a suspending point in captured relation and then transporting them by vacuum suspension to a plurality of separate discharge stations, comprising the combination of:

at least a pair of conveyor belts disposed in vertically spaced, overlapping relation to define an elongate nip therebetween extending from a capturing point to a suspending point the upper of said belts extending beyond said suspending point and being provided with a series of openings extending longitudinally thereof;

feed means for feeding articles to said capturing point in sequentially spaced relation so as to be captured between said belts and transported therebetween to said suspending point;

suction means overlying said upper belt beyond said suspending point and defining a first chamber for subjecting the articles to vacuum through said openings to suspend them after they pass beyond said suspending point, said suction means defining a plurality of further and separate chambers in spaced sequence beyond said suspending point: and control means for independently controlling vacuum to said further suction chambers to release said articles sequentially at their respective stations beginning at that station located most remotely from said suspending point, said control means including detector means associated with each station for effecting the discharge of each article at its respective station;

said upper belt being formed by a pair of flights extending in side-by-side but spaced apart relation and said detector means being located between said flights.

5. In a conveying system as defined in claim 4 wherein there is a sequential group of said chambers associated with each of said stations and wherein any one of the detector means associated with the chambers of each group is effective to control vacuum to all of the chambers of that group.

6. In a conveying system for transporting a sequence of articles to a suspending point in captured relation and then transporting them by vacuum suspension to a plurality of separate discharge stations, comprising the combination of:
- a pair of endless conveyor means disposed in substantially parallel, vertically spaced, and overlapuing relation to define an elongate nip therebetween extending from a capturing point to a suspending point, the upper of said conveyor means extending beyond said suspending point and having a suspending flight provided with a series of openings extending longitudinally thereof;
- feed means for feeding articles to said capturing point in sequentially spaced relation so as to be captured between said conveyor means and transported therebetween to said suspending point;
- suction means overlying said suspending flight of said upper conveyor means beyond said suspending point and defining a first chamber for subjecting the articles to vacuum through said spenings to suspend them from said suspending flight after they pass beyond said suspending point, said suction means defining a plurality of further and separate chambers in spaced sequence beyond said suspending point;
- transport means disposed in spaced relation below said suspending flight and defining a plurality of rows of discharge stations, said transport means being steppable sequentially to position said rows of discharge stations, one row at a time, below said suspending flight with the discharge stations of the positioned row extending lengthwise of the suspending flight; and
- control means for independently controlling vacuum to said further suction chambers to release said articles sequentially at their respective stations of a row thereof positioned below said suspending flight, and including detector means for releasing said articles sequentially beginning at the discharge station located most remotely from said suspending point;
- said suspending flight being formed by a pair of belts extending in sidebyside but spaced apart relation and said detector means being located between said belts.

7. In a conveying system as defined in claim 6 wherein there is a sequential group of said chambers associated with each of said stations and wherein any one of the detector means associated with the chambers of each group is effective to control vacuum to all of the chambers of that group.

8. In a conveyor system as defined in claim 7 wherein said suction means comprises a slotted housing overlying each of said belts and a further housing bridging between said slotted housings, said detector means being positioned below said further housing and between said slotted housings.

* * * * *